United States Patent
Fukasawa

[19]

[11] Patent Number: 6,065,331
[45] Date of Patent: May 23, 2000

[54] METHOD AND APPARATUS FOR PREDICTING A HIGHER-ORDER COMPONENT OF HIGH SPEED UNIFORMITY OF A TIRE, AND METHOD OF MANUFACTURING TIRES

[75] Inventor: Katsushi Fukasawa, Saitama-ken, Japan

[73] Assignee: Bridgestone Corporation, Tokyo, Japan

[21] Appl. No.: 09/267,653

[22] Filed: Mar. 15, 1999

[30] Foreign Application Priority Data

Jun. 4, 1998 [JP] Japan ................................. 10-156212

[51] Int. Cl.[7] .................................................. G01M 17/02
[52] U.S. Cl. .............................................................. 73/146
[58] Field of Search ................................. 73/7, 8, 11, 146, 73/660, 669; 152/209 D, 209 R

[56] References Cited

U.S. PATENT DOCUMENTS

| | | | |
|---|---|---|---|
| 3,862,570 | 1/1975 | Ongaro | 73/146 |
| 4,856,324 | 8/1989 | Potts | 73/146 |
| 5,259,246 | 11/1993 | Stuyts | 73/669 |
| 5,343,918 | 9/1994 | Fontaine | 152/209 R |
| 5,396,438 | 3/1995 | Oblizajek | 364/552 |

*Primary Examiner*—William Oen
*Attorney, Agent, or Firm*—Sughrue, Mion, Zinn, Macpeak & Seas, PLLC

[57] ABSTRACT

In a state in which a load is applied thereto, one tire of one lot of tires is made to contact a drum to which a cleat is mounted, and the drum is rotated. Vertical axial force Fz of the tire is measured by an axial force sensor, and vertical displacement X of a tire axis with respect to a drum surface is measured by a displacement sensor. A transfer characteristic Fz/X is calculated as a vertical dynamic stiffness $K(\omega)$) of the tire at a time of rolling. A magnitude and phase of vertical dynamic stiffness $K(\omega)$ of the tire at a low speed and a magnitude and phase of vertical dynamic stiffness $K(\omega)$ of the tire at a high speed are stored in a personal computer. The other tires within the same lot are set at a low speed uniformity machine one by one, and low speed RFV and RRO are measured for each tire. Prediction of high speed RFV is carried out based on the measured low speed RFV and RRO, the magnitude and phase of the vertical dynamic stiffness $K(\omega)$ of the tire at a low speed, and the magnitude and phase of the vertical dynamic stiffness $K(\omega)$ of the tire at a high speed. Prediction of high speed uniformity in a short time is enabled.

20 Claims, 7 Drawing Sheets

F I G. 1
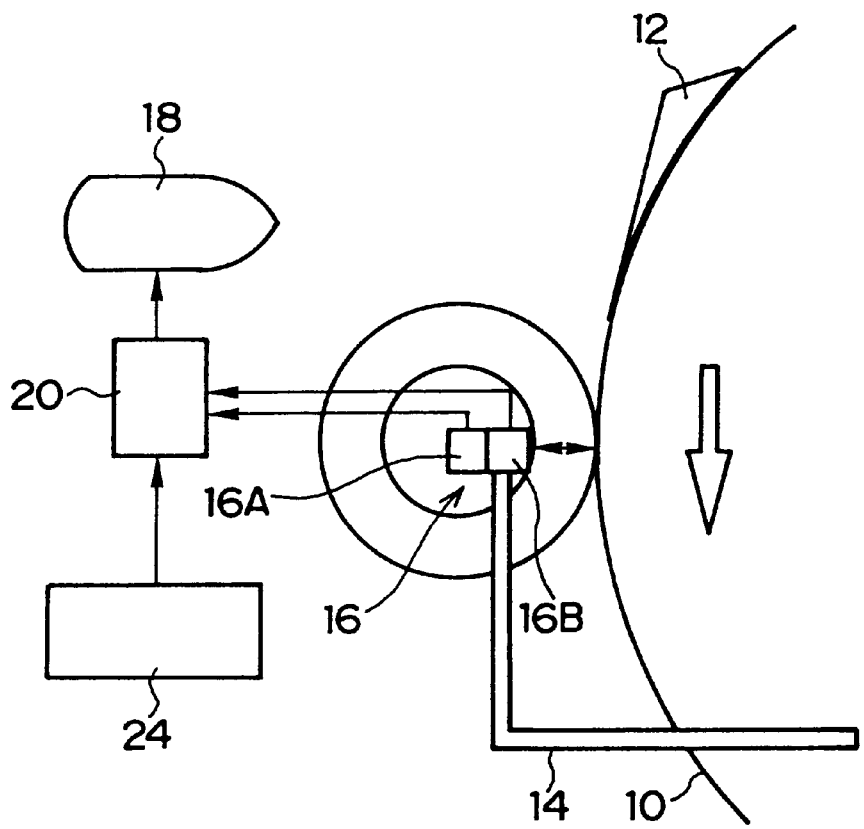
F I G. 2
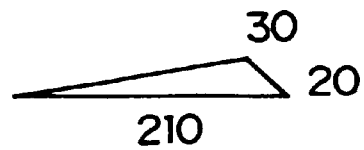

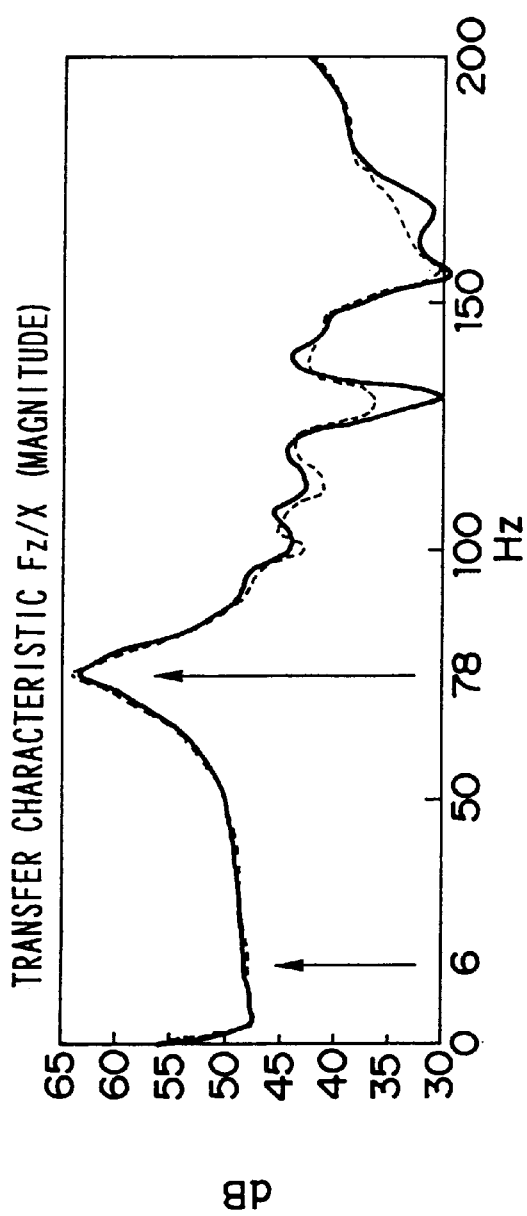
F I G. 3 A
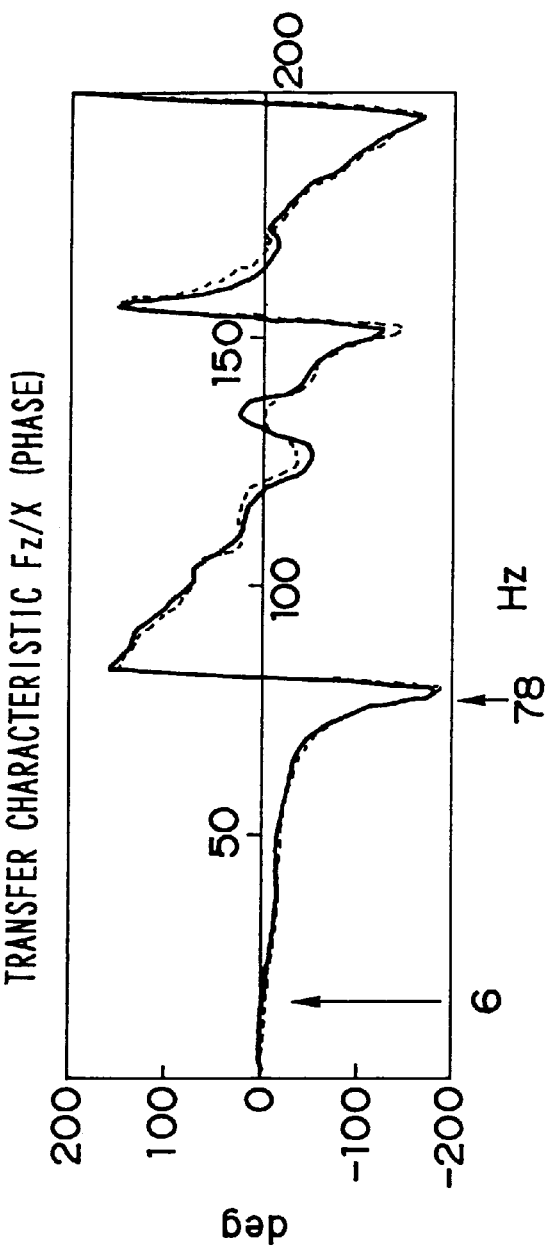
F I G. 3 B

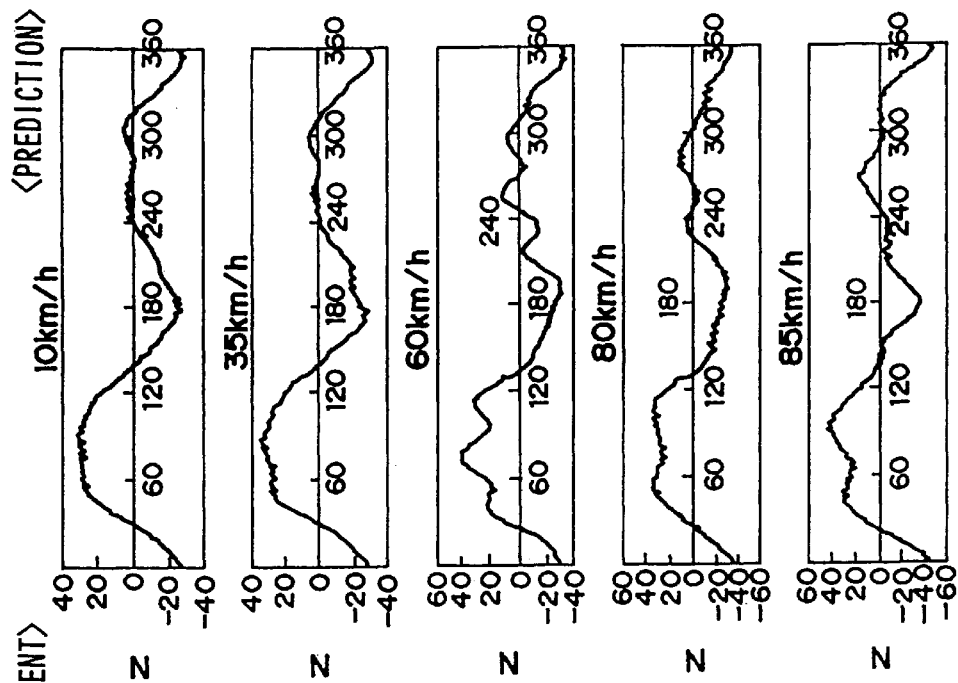
FIG. 6A
COMPARISON OF TIME SERIES WAVEFORMS  〈ACTUAL MEASUREMENT〉
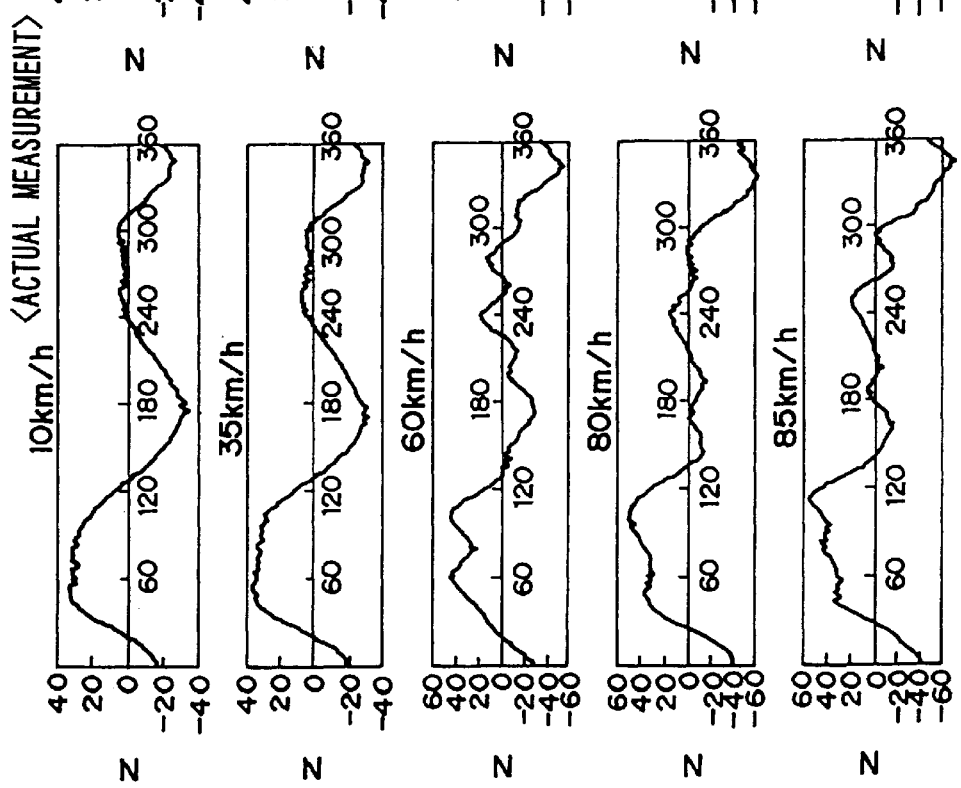
FIG. 6B  〈PREDICTION〉

COMPARISON OF
SPEED DEPENDENCIES
OF ORDER COMPONENTS

COMPARISON OF
SPEED DEPENDENCIES
OF ORDER COMPONENTS

METHOD AND APPARATUS FOR PREDICTING A HIGHER-ORDER COMPONENT OF HIGH SPEED UNIFORMITY OF A TIRE, AND METHOD OF MANUFACTURING TIRES

BACKGROUND OF THE INVENTION

1. Field of the Invention

The present invention relates to a method and apparatus for predicting a higher-order components of high speed uniformity of a tire, in which a higher-order component (for example, a component of the second order or higher) of high speed uniformity at the time a tire rolls at a high speed is predicted based on low speed uniformity at the time the tire rolls at a low speed, and also relates to a method of manufacturing tires, which comprises the step of selecting a tire by using a higher-order component of high speed uniformity of the tire, which is predicted by the method or apparatus for predicting a higher-order component of high speed uniformity of a tire.

2. Description of the Related Art

The number of cases in which higher-order components of high speed uniformity of a tire cause noise due to vibration has recently increased. It is thought that this problem caused by the higher-order components of high speed uniformity has become marked due to a decrease in the value of the first-order component of tire uniformity.

Further, higher-order components of high speed uniformity cause a problem in the resonance phenomena with other tire characteristics (natural frequency, cavity resonance frequency, and the like), and depends on the natural frequency, the cavity resonance frequency, and the like, and also generates noise mainly comprised of booming noise, beat noise, or the like in the interior of a vehicle.

The uniformity of a tire results from various mechanisms depending on speed, and therefore, it cannot be said that the uniformity at the time of rolling at a low speed and the uniformity at the time of rolling at a high speed correspond to each other well. There have conventionally been known the following methods as methods for predicting higher-order components of high speed uniformity of a tire based on low speed uniformity.

(1) Method Using a Regression Equation

This is a method in which a high speed uniformity and a low speed uniformity are measured, and a regression equation is derived from the measured values and is used to make the high speed uniformity and the low speed uniformity correspond to each other.

(2) Method Using a Predictive Equation Based on Statistical Processing

In this method, several tens of tires prepared in advance are used, and a radial force variation (RFV) at a low speed, a radial force variation (RFV) at a high speed, and a rolling radius variation are measured. The first- through fourth-order components of a high speed tangential force variation (TFV) are predicted from a constant obtained by statistical processing from the above-described measured values, and from an RFV at a low speed and a rolling radius variation which are measured for each tire (see U.S. Pat. 5,396,438).

In both the above-described method using a regression equation and method using a predictive equation based on statistical processing, the low speed uniformity and the high speed uniformity are not strictly related to each other, and therefore, the low speed uniformity and the high speed uniformity do not correspond to each other well. Further, there is a drawback in that it is difficult to predict the high speed uniformity at an arbitrary speed and order.

Further, in the method using a predictive equation based on statistical processing, several tens of tires prepared in advance must be used for testing each at a low speed and at a high speed each time the contents of a lot are changed. Accordingly, there is a drawback in that much time is required.

SUMMARY OF THE INVENTION

The present invention has been devised to solve the above-described drawbacks, and an object thereof is to provide a method and apparatus for predicting higher-order components of high speed uniformity of a tire, in which, by using moving rigidities at the time of rolling of one tire within one lot of tires, a higher-order component of high speed uniformity of each tire in the same lot can be predicted in a short time, and also to provide a method of manufacturing tires.

In order to achieve the above-described object, the inventions according to claim 1 and claim 5 comprise the steps of:

measuring, for one of tires within one lot of tires, a low-speed dynamic stiffness at a frequency corresponding to an order of a higher-order component to be predicted when said tire rolls at a low speed, and a high-speed dynamic stiffness at a frequency corresponding to said order when said tire rolls at a high speed;

measuring, for each of the other tires within the lot of tires, a variation component of load when the tire rolls at a low speed, and a rolling radius variation; and for each of said other tires, predicting, as said higher-order component, a variation component of load during rolling at high, on the basis of said low-speed dynamic stiffness, said high-speed dynamic stiffness, said variation component of load, and said rolling radius variation.

Further, the invention according to claim 10 and claim 14 are provided in such a manner that, as the higher-order component, a variation component of fore and aft force (tangential force variation) is predicted in place of the variation component of load (radial force variation) described in claims 1 and 5.

According to the invention of claims 1 to 18, by using the moving rigidities (low-speed dynamic stiffness and high-speed dynamic stiffness) at the time of rolling for one of tires within a lot, it is possible to predict a higher-order variation component of load or fore and aft force (longitudinal force) of each tire within the same lot. Accordingly, a higher-order component of high speed uniformity can be predicted simply in a short time.

By providing the step of selecting tires by using the predicted variation components of load when tires roll at a high speed or variation components of longitudinal force when tires roll at a high speed, the invention according to claims 1 to 18 can be applied to a method of manufacturing tires. In this selecting step, the predicted variation component of load when a tire rolls at a high speed and a reference value are compared with each other. In this case, a tire whose variation component of load is larger than the reference value is forwarded after having been corrected and. A tire whose variation component of load is less than or equal to the reference value is forwarded without being corrected. Alternatively, in this selecting step, the predicted variation component of longitudinal force when a tire rolls at a high speed and a reference value may be compared with each other. In this case, a tire whose variation component of longitudinal force is larger than the reference value is forwarded after having been corrected and a tire in which the variation component of longitudinal force is less than or equal to the reference value is forwarded without being corrected.

BRIEF DESCRIPTION OF THE DRAWINGS

FIG. 1 is a schematic diagram of an apparatus for predicting a higher-order component of high speed uniformity of a tire.

FIG. 2 is a cross sectional view of a cleat.

FIG. 3A is a diagram showing magnitudes of transfer characteristics measured by a predicting apparatus shown in FIG. 1, and FIG. 3B is a diagram showing phases of transfer characteristics measured by the predicting apparatus shown in FIG. 1.

FIG. 6A and 6B are diagrams which each show comparison between predicted values and measured values of a time-based waveform.

DESCRIPTION OF THE PREFERRED EMBODIMENTS

Figure 4:
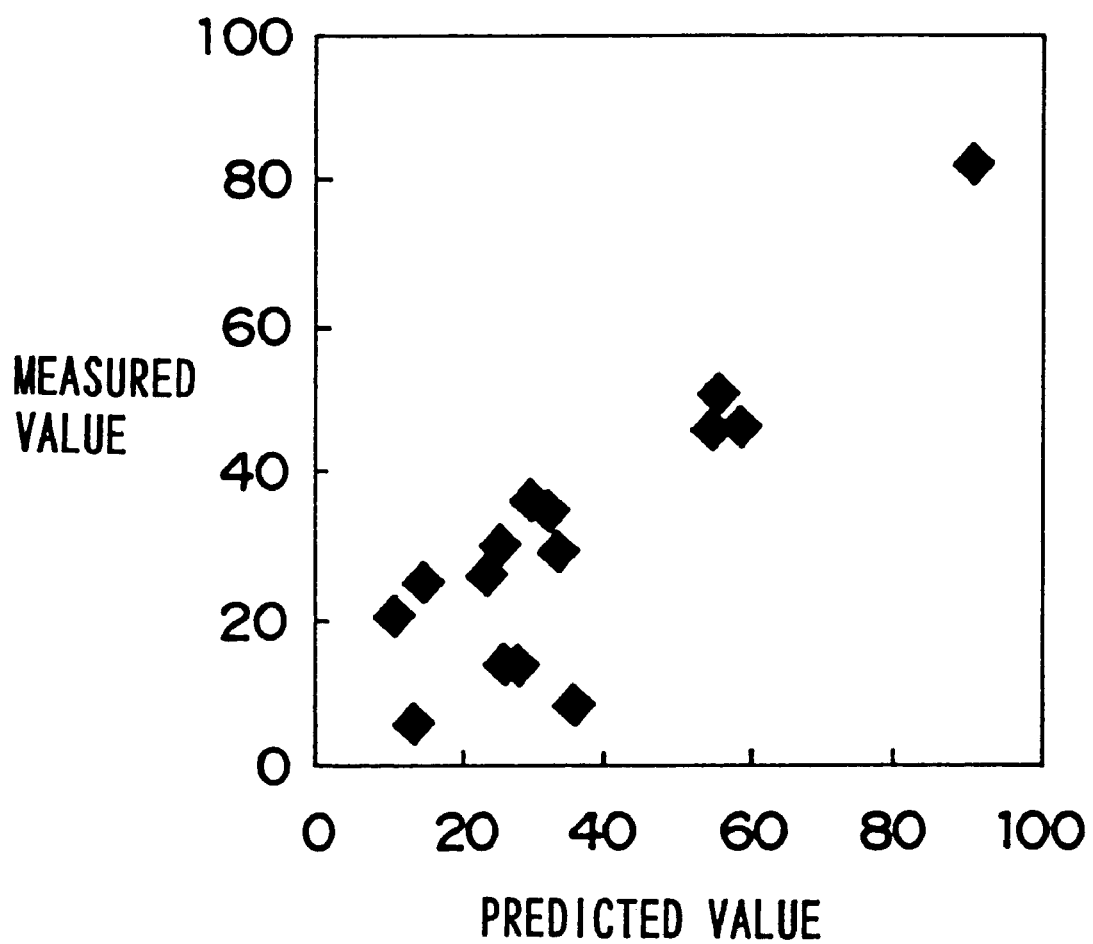
FIG. 4 is a diagram which shows the correlation between measured values and predictive values of a sixth-order component of high speed RFV.

An embodiment of the present invention will be hereinafter described in detail.

Uniformity, such as radial force variation (RFV) and tangential force variation (TFV), is a variation of force which acts on a tire axis when the tire rolls with the load radius set constant. In the case of RFV which is a variation component in the load, RFV and load W have the relation given by the following expression:

$$W = W_o + RFV$$
$$= (K_o + K_v) \cdot (D_o + D_v)$$
$$= K_o \cdot D_o + K_o \cdot D_v + K_v \cdot D_o + K_v \cdot D_v$$

wherein, $W_o$ is a direct current component of the load W; $K_o$ is a vertical stiffness constant; $D_v$ is an amount of variation in deflection; $K_v$ is an amount of variation in stiffness; and $D_o$ is a direct current component of an amount of deflection.

$K_0 \cdot D_o$ indicates the load and $K_v \cdot D_v$ is almost zero. Accordingly, RFV can be considered to become a sum of two components as shown in the following expression (1):

$$RFV = K_o \cdot D_v + K_v \cdot D_o \qquad (1)$$

In the above expression (1), the first term of the right side, $K_o \cdot D_v$, is a component in which circumferential non-uniformity (radial run out) of a tire size becomes a variation in deflection to form an axial force via an average vertical stiffness (constant $K_o$) on the circumferential line of a tire. The second term, $K_v \cdot D_o$, is a component which causes variation in the axial force because the stiffness constant of a vertical stiffness varies on the circumferential line of a tire even if no variation in deflection occurs. The above first and second terms will be hereinafter referred to as the term $K_o$ and the term $K_v$, respectively.

In expression (1), when the speed is sufficiently low, each parameter may be considered to be a static parameter. In this case, RFV on the left side of the equation can be easily measured, and among the parameters on the right side, the stiffness constant of a vertical spring, $K_o$, the radial run out (RRO), $D_v$, and the DC component of the amount of deflection, $D_o$, can also usually be measured easily. However, the variation in stiffness, $K_v$, is not usually measured directly because measurement thereof requires much time.

Accordingly, the term $K_v$ is indirectly obtained as a difference between RFV on the left side of expression (1), which is to be measured, and the term $K_o$ on the right side.

Next, how the terms $K_o$ and $K_v$ each vary depending on the speed of the tire when the rolling speed of tires increases, shall be considered. First, each term is formed as a product of a variation component ($D_v$ and $K_v$), which are inputted values, and a transfer gain ($K_o$ and $D_o$).

The variation component $D_v$ (radial run out) which is an inputted value varies with its cycle of variation being inversely proportional to the speed. It has been confirmed by experiment that the variation in amplitude due to speed is small.

The variation in stiffness, $K_v$, which is an inputted value, varies with its cycle of variation being inversely proportional to the speed, and it is not clear how the amplitude thereof depends on the speed. However, in this case, assuming that a spring such as a perfect elastic body of a simple hook is disposed dispersedly on the circumferential line of a tire, the variation in stiffness, $K_v$, does not change in accordance with the speed, i.e., is not dependent on the speed.

Further, the transfer gain, $D_o$, is deflection and may be constant. However, when the frequency of $D_v$, which is an inputted value, increases, together with an increase of the speed, by an integer multiple of the first order of the tire rotation, the stiffness constant of a vertical spring, $K_o$, overlaps with a region of a tire natural frequency depending on the order. For this reason, it is necessary to take into consideration the frequency-dependent dynamic stiffness.

Assuming the above, RFV can be expressed as follows in the form of a Fourier series as a function of speed V and time t.

$$RFV(V, t) = \sum_{n=1}^{\infty} F_n(V)\cos(nV \cdot t / R_e - \varphi_n(V)) \qquad (2)$$
$$= \sum_{n=1}^{\infty} F_{kn} \cdot \cos(nV \cdot t / R_e - \beta_{kn}) + \sum_{n=1}^{\infty} \Delta r_n \cdot$$
$$|K(nV / R_e)| \cdot \cos(nV \cdot t / R_e - \beta_n + \phi_k(nV / R_e))$$

wherein, the stiffness variation force is expressed as:

$$F_k(V, t) = \sum_{n=1}^{\infty} F_{kn} \cdot \cos(nV \cdot t / R_e - \beta_{kn});$$

the dynamic stiffness is expressed as:

$$K(\omega) = |K(nV/R_e)| \cdot \exp\{j\phi_k(nV/R_e)\};$$

and the variation in deflection is expressed as:

$$D(V, t) = \sum_{n=1}^{\infty} \Delta r_n \cdot \cos(nV \cdot t / R_e - \beta_n)$$

$F_n(V)$ is the amplitude of an n-th order Fourier component of RFV at speed V;

$\psi_n(V)$ is the phase of the n-th order Fourier component of RFV at speed V;

$R_e$ is the rolling radius of the tire;

$F_{kn}$ is the amplitude of an n-th order Fourier component of a stiffness variation force component (the term $K_v$);

$\beta_{kn}$ is the phase of the n-th order Fourier component of the stiffness variation force component (the term $K_v$);

$\Delta r_n$ is the amplitude of an n-th order Fourier component of a deflection variation component (radial run out);

$\beta r_n$ is the phase of the n-th order Fourier component of the deflection variation component (radial run out);

$|K(nV/R_e)|$ is magnitude of the tire vertical dynamic stiffness $K(\omega)$ at $\omega = nV/R_e$; and $\phi_k(nV/Re)$ is the phase of the tire vertical dynamic stiffness $K(\omega)$ at $\omega = nV/R_e$.

In above expression (2), the first term on the right side is the stiffness variation force component and corresponds to the term Kv in expression (1), and the second term on the right side corresponds to the term $K_o$ in expression (1).

Here, RFV at a low speed is obtained by replacing V with $V_o$ (low speed) (i.e. $V=V_o$) in above expression (2), and RFV at a low speed (for example, 60 rpm) is expressed by the following expression.

$$RFV(V_o, t) = \sum_{n=1}^{\infty} F_n(V_o) \cdot \cos(nV_o \cdot t / R_e - \varphi_n(V_o)) \quad (3)$$

$$= \sum_{n=1}^{\infty} \beta_{kn} \cdot \cos(nV_o \cdot t / R_e - \beta_{kn}) + \sum_{n=1}^{\infty} \Delta r_n \cdot$$

$$|K(nV_o / R_e)| \cdot \cos(nV_o \cdot t / R_e - \beta_n + \phi_k(nV_o / R_e))$$

As long as the tire vertical dynamic stiffness $K(\omega)$ at a low speed is obtained, the amplitude $F_{kn}$ and phase $\beta_{kn}$ of a Fourier order parameter of a stiffness variation force component (the term $K_v$) which is not dependent on speed can be determined, by calculation, by using the low speed RFV and data $\Delta r_n$ of the Fourier order analysis of the radial run out from above expression (3). As long as the tire vertical dynamic stiffness $K(\omega)$ at a high speed is obtained, RFV at a high speed can be predicted from the amplitude $F_{kn}$ and the phase $\beta_{kn}$ determined as described above and also from the above expression (2). As the low speed RFV, a measured value obtained by a low speed uniformity machine is used. Further, as the data $\Delta r_n$ of the Fourier order analysis of the radial run out, a rolling radius variation which will be described later is used.

Next, a description will be given of a method for obtaining tire vertical dynamic stiffness $K(\omega)$ at the time of rolling.

As the tire vertical dynamic stiffness $K(\omega)$ at the time of rolling, the tire vertical dynamic stiffness at the time of rolling of one tire within the same lot is used representatively, under the assumption that the value thereof does not vary among tires of the same tire size and the same tire structure.

The tire vertical dynamic stiffness $K(\omega)$ at the time of rolling is obtained from vertical displacement of a tire axis, namely, vertical displacement X of a drum surface and vertical axial force Fz of a tire, which are measured by using a protrusion run-over type testing machine including a drum 10 having a cleat 12, which is made of fiberglass reinforced plastic (FRP) and is mounted on the surface of the drum 10 as shown in FIG. 1, and also including a sensor 16 mounted at an end of a stand.

The cleat 12 is, as shown in FIG. 2, formed to have a triangular cross sectional configuration having a base of 210 mm, a height of 20 mm, and a shorter side of 30 mm. It suffices that the length of the longer side of the cleat 12 is greater than or equal to the ground contact length of the tire.

The sensor 16 is provided with an axial force sensor (a three-way axial force sensor) 16A formed by a load cell which detects the vertical axial force Fz of the tire, and a displacement sensor 16B formed by a laser displacement meter which detects displacement of a tire axis with respect to the drum surface.

The axial force sensor 16A and the displacement sensor 16B are each connected to a personal computer 20 which serves as a predicting apparatus and to which a CRT 18 provided as a display device for displaying measured data and the like is connected.

When the vertical dynamic stiffness $K(\omega)$ of a tire at the time of rolling is to be measured, input is applied to the tire axis in the vertical direction by the tire with a load applied thereto being made to contact the drum 10 and the drum 10 on which the cleat 12 is mounted being rotated. At this time, the vertical axial force Fz of the tire is measured by the axial force sensor 16A, and the vertical displacement X of the tire axis with respect to the drum surface is measured by the displacement sensor 16B.

In the personal computer 20, the transfer characteristic Fz/X of the vertical axial force Fz of the tire with respect to the vertical displacement X of the tire axis is calculated as the vertical dynamic stiffness $K(\omega)$ of the tire at the time of rolling, and the magnitude and phase of the transfer characteristic Fz/X, which are required for prediction of RFV at high speed, are obtained.

A cleat such as a long-period mound is used as the cleat. For this reason, an input approximating an input from the drum surface can be provided, and further, relatively stable data can be obtained even at a high speed.

FIG. 3A shows the magnitudes of the transfer characteristics Fz/X of two tires within the same lot, which are measured as described above, and FIG. 3B shows the phases of the transfer characteristics Fz/X.

The magnitude and phase of the vertical dynamic stiffness $K(\omega)$ of a tire corresponding to a time of low speed and the magnitude and phase of the vertical dynamic stiffness $K(\omega)$ of a tire corresponding to a time of high speed are obtained from FIGS. 3A and 3B. In the present embodiment, there will be described, as an example, a case in which a sixth-order component of RFV is predicted with the low speed being 60 rpm and the high speed being 85 km/h.

The magnitude and phase of the vertical dynamic stiffness $K(\omega)$ of a tire each at low speed and at high speed are represented by the magnitude and phase of the transfer characteristic Fz/X of a frequency corresponding to the order of the higher-order component to be predicted. The frequency corresponding to the order of the higher-order component is represented by the product of the order of the higher-order component and the tire rotational frequency. In the present embodiment, the sixth-order component is predicted, and therefore, the frequency corresponding to the low speed is that $6^x$ tire rotational frequency (1 Hz)=6Hz and the frequency corresponding to the high speed is $6^x$ tire rotational frequency (13 Hz)=78 Hz.

Accordingly, the magnitude and phase of the transfer characteristic Fz/X at 6 Hz are used for the magnitude and phase of the vertical dynamic stiffness $K(\omega)$ of a tire at low speed. The magnitude and phase of the transfer characteristic Fz/X at 78 Hz are used for the magnitude and phase of the vertical dynamic stiffness $K(\omega)$ of a tire at high speed.

The magnitude and phase of the vertical dynamic stiffness $K(\omega)$ of the tire at low speed and the magnitude and phase of the vertical dynamic stiffness $K(\omega)$ of the tire at high speed are stored in a RAM within the personal computer 20.

Next, a description will be given of a method for obtaining variation in deflection (rolling radius variation).

A measured value of radial run out (RRO) may be used as the rolling radius variation, but if so, cases in which the RRO does not exhibit a satisfactory correspondence with the rolling radius may occur, depending on the position of measurement.

Accordingly, as a method for directly measuring a rolling radius variation, there is also known a method in which an amount of rolling radius variation is obtained by measuring an amount of variation in the rotational speed of a tire from an amount of variation in time between pulses obtained by a laser Doppler type non-contact speed meter or a rotary encoder on a rotating surface on which a variation of speed within one rotation of a tire occurs. However, it is difficult to measure the rolling radius variation precisely and fixedly, and therefore, RRO calculated from TFV is used herein.

Specifically, at the time of low speed, TFV and rolling radius variation are substantially proportional to each other. For this reason, a linear regression equation represented by the following expression (4) is obtained from measured values of TFV and RRO with a number of tires N=20, and RRO obtained from the measured TFV is used.

$$RRO = A \cdot TFV(V) + B \quad (4)$$

In the above expression (4), A and B are each a constant. The linear regression equation is stored in the RAM within the personal computer 20.

Further, an average value of radial run out of a shoulder portion may be used as the rolling radius variation.

A low speed uniformity machine 24 is, as shown in FIG. 1, connected to the personal computer 20 having the RAM in which are stored the magnitude and phase of the vertical dynamic stiffness K($\omega$) of a tire at a low speed, the magnitude and phase of the vertical dynamic stiffness K($\omega$) of a tire at a high speed, and the linear regression equation by which RRO is obtained. An apparatus for predicting a higher-order component of high speed uniformity of a tire is thus structured.

When a high speed RFV for other tires within the same lot is predicted by using the apparatus for predicting a higher-order component of high speed uniformity of a tire, the tires within the same lot are set at the low speed uniformity machine 24 one by one, and the low speed RFV and the RRO based on above expression (4) are measured.

The measured low speed RFV and RRO are, together with the magnitudes and phases of the vertical dynamic stiffness K($\omega$) of the tire at low speed stored in the RAM, substituted into the above expression (3), and the amplitudes $F_{kn}$ and the phases $\beta_{kn}$ are calculated. The amplitudes $F_{kn}$ and the phases $\beta_{kn}$ are, together with the magnitudes and phases of the vertical dynamic stiffness K($\omega$) of the tire at high speed stored in the RAM, substituted into the above expression (2), and a sixth-order component of high speed RFV is thereby predicted.

The predicted sixth-order component of high speed RFV and a reference value are compared with each other. A tire whose sixth-order component of high speed RFV is larger than the reference value is forwarded with, for example, the radial run out (RRO) thereof corrected. Further, a tire whose sixth-order component of high speed RFV is smaller than the reference value is forwarded, as a properly manufactured tire, without any correction being made thereto.

When the sixth-order component of high speed RFV is predicted by the above-described method, the correlation coefficient of the measured value and the predicted value is 0.87 as shown in FIG. 4, and the corresponding relation is therefore satisfactory.

In the foregoing, a case in which the high speed RFV is predicted was described. However, as long as TFV is used in place of RFV in the above expressions (2) and (3), the high speed TFV can be predicted. The vertical dynamic stiffness of a tire, which is necessary for prediction of TFV, is obtained from the longitudinal axial force Fx of the tire and the vertical input displacement X of the drum surface.

Namely, when the high speed TFV is to be predicted, in the protrusion run-over testing machine shown in FIG. 1, the tire is caused to contact the drum with a load being applied to the tire, and the drum on which the cleat is mounted is rotated to apply input in a longitudinal direction of the tire. At this time, the longitudinal axial force Fx of the tire is measured by the axial force sensor 16A. Further, at this time, the vertical displacement X of the drum surface is measured by the displacement sensor 16B. Then, the transfer characteristic Fx/X is calculated, and the magnitude and phase of the transfer characteristic Fx/X which are necessary for the prediction are obtained.

Figure 5:
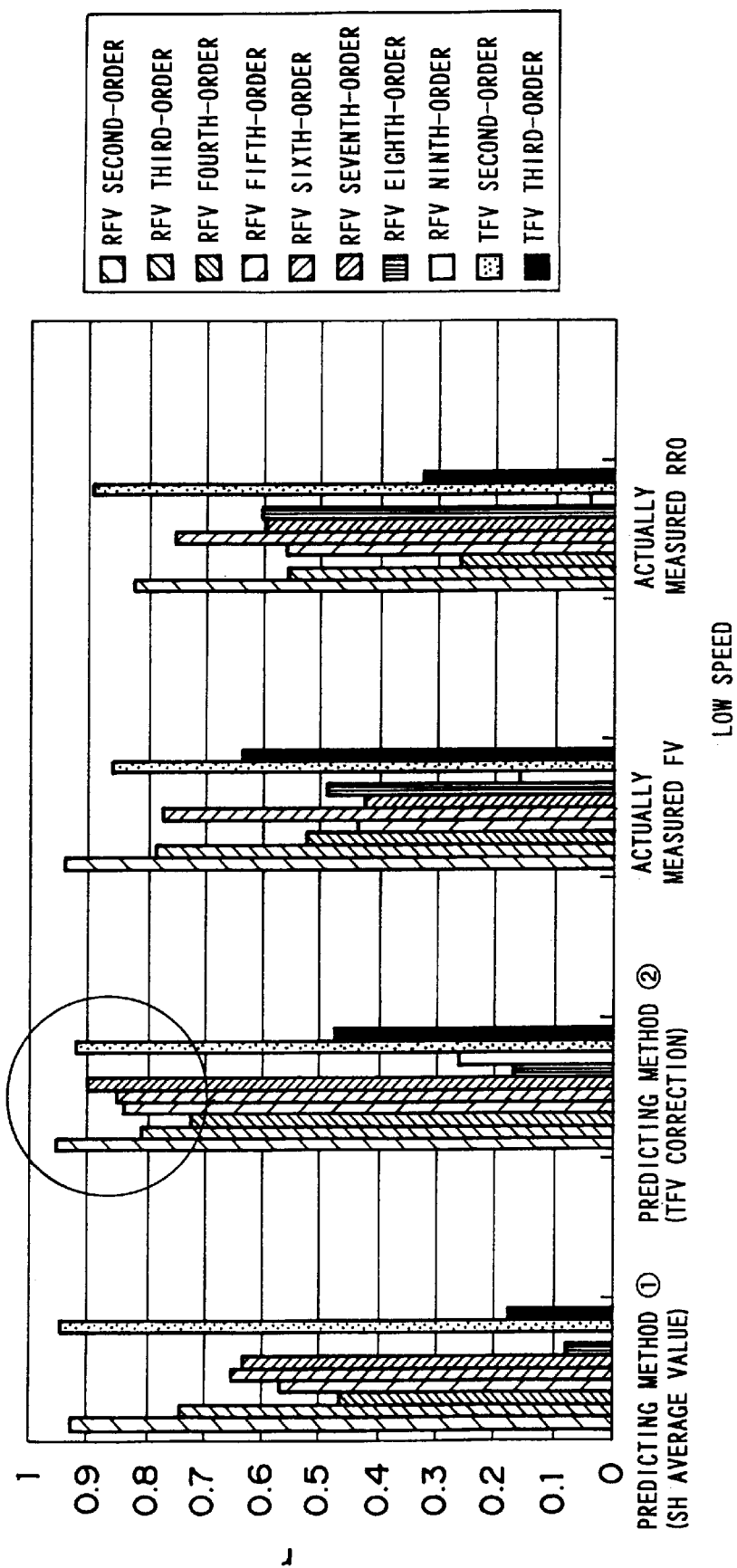
FIG. 5 is a diagram which comparatively illustrates coefficients of correlation when higher-order components are each predicted by four predicting methods.

Moreover, the present invention can also be applied to a case in which higher-order components other than the sixth-order components of RFV and TFV are predicted. FIG. 5 is a diagram which comparatively illustrates comparison of correlation coefficients when each of the second- to ninth-order components of RFV and the second- and third-order components of TFV is predicted by four predicting methods.

In FIG. 5, predicting method ① uses, as the rolling radius variation, an average value of radial run out of a shoulder portion. Predicting method ② uses, as the rolling radius variation, RRO obtained from the linear regression equation (4) shown above. Further, a low speed RFV or TFV is used as the actually measured FV. An average value of radial run out of a shoulder portion is used as the actually measured RRO. In the predicting methods ① and ②, satisfactory correspondence is achieved even when compared with the actually measured FV and actually measured RRO. Particularly, in predicting method (2), as long as the measured value is not small, an extremely good correlation is achieved (see the encircled portion in FIG. 5).

(1) Prediction of Time-based Waveform

The above expression (2) is expressed as a function of speed V and time t, and therefore, time series waveforms for respective speeds as shown in FIGS. 6A and 6B can be generated and displayed on a CRT. The time series waveforms shown in FIG. 6A and FIG. 6B include first- through tenth-order components and are shown for the speed ranges of 10 to 85 km/h. The measured waveform and the predicted waveform exhibit roughly similar trends, and the respective overall values (O.A. values) thereof are also close.

(2) Dependency on Speed of a Certain Order Component

Figure 7A:
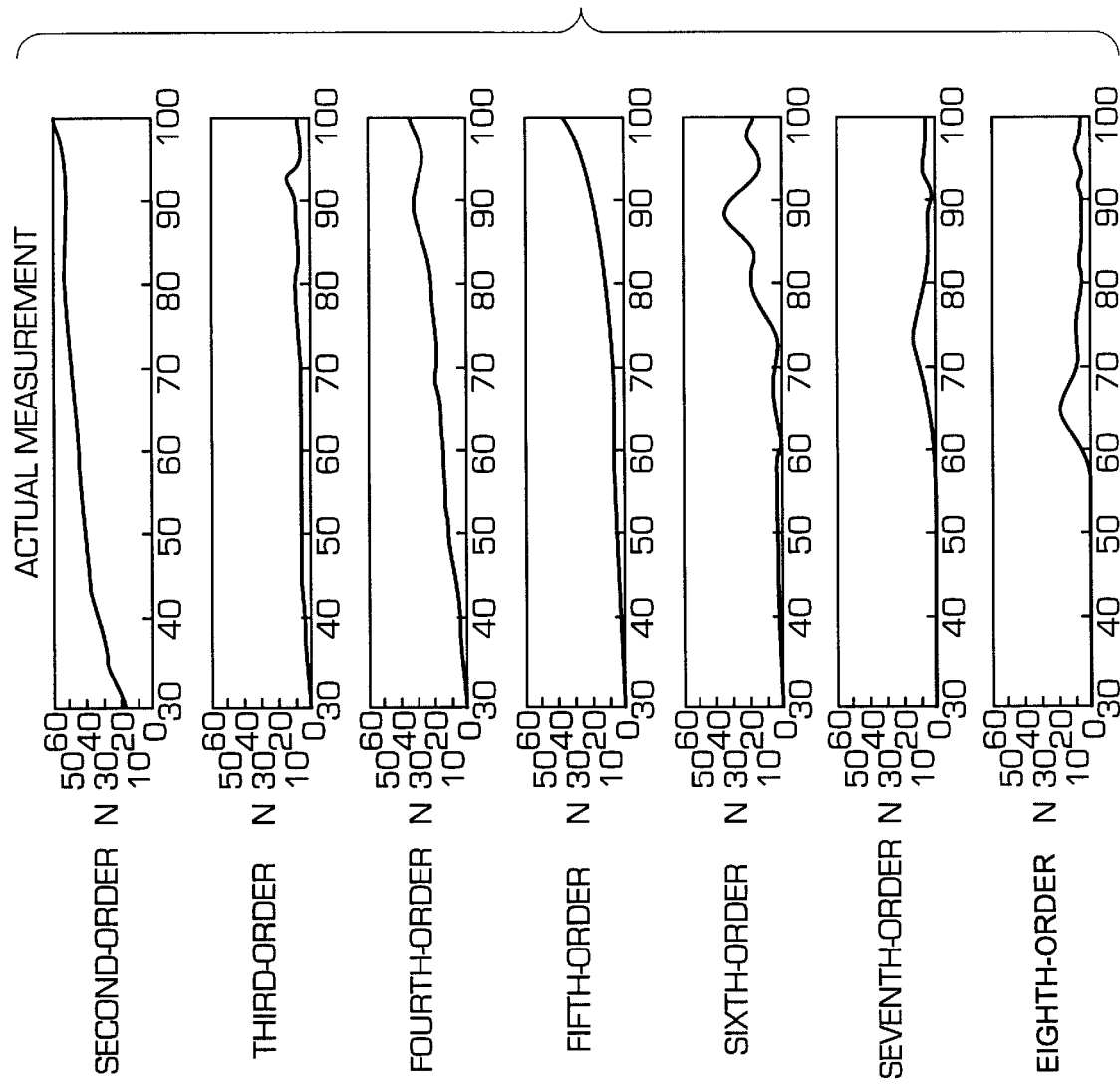
FIG. 7A and 7B are diagrams which each show a comparison between predicted values and measured values of components of each order.
Figure 7B:
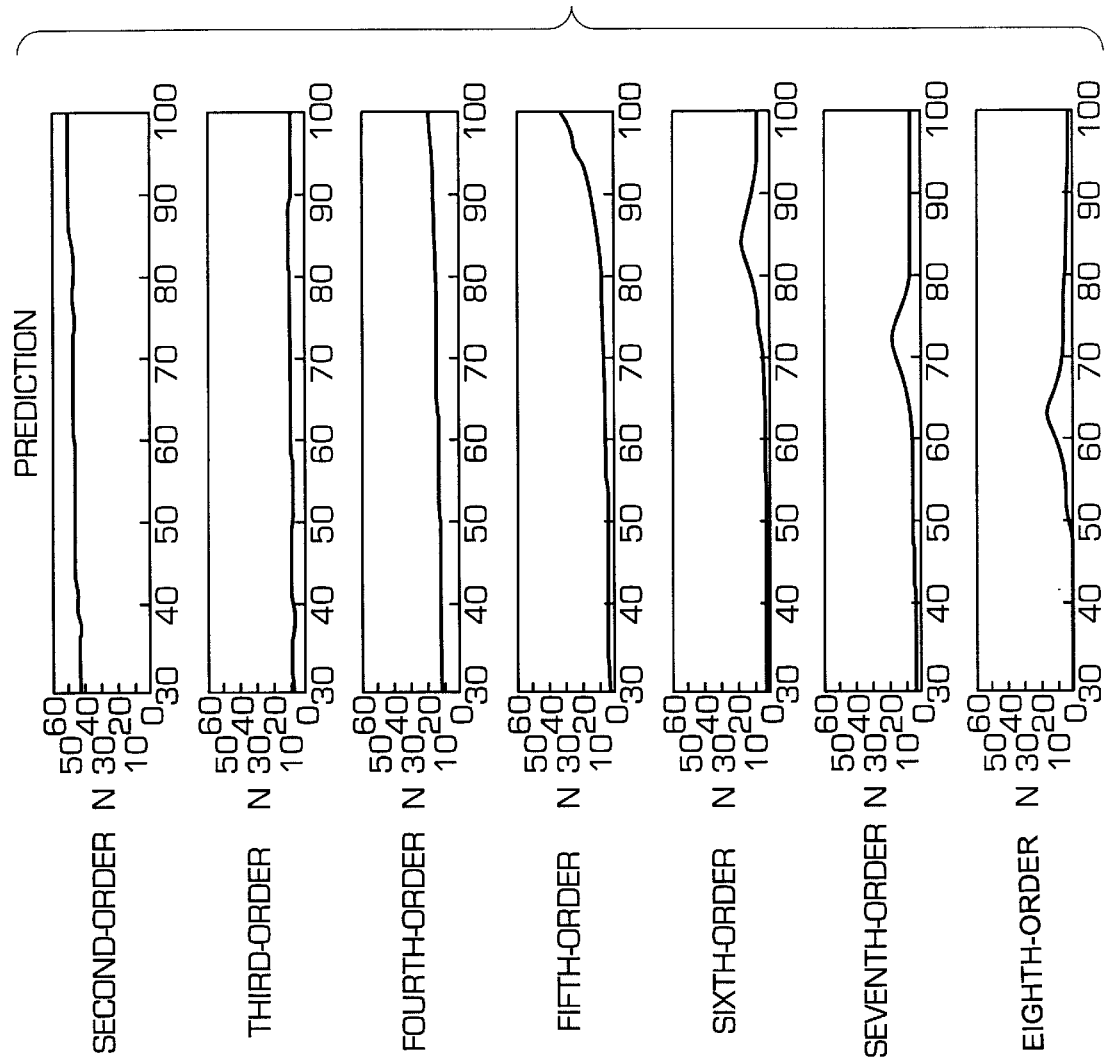

For each order component, dependency on speed can be represented by amplitude values with respect to speed as shown in FIGS. 7A and 7B. The magnitude of a resonance peak recognized in an estimated component of the fifth order or higher substantially coincides with the magnitude of a resonance peak at a measured speed, which corresponds to the above-described resonance peak.

As described above, according to the present invention, by using the dynamic stiffness of each tire within one lot of tires, the variation component of load or the variation component of longitudinal force, which is the high speed uniformity of the other tires in the same lot, can be predicted. Accordingly, the present invention has an effect in that a higher-order component of high speed uniformity can be predicted in a short time and in a simple manner.

What is claimed is:

1. A method for predicting a higher-order component of high speed uniformity of a tire, comprising the steps of:

measuring, for one of tires within one lot of tires, a low-speed dynamic stiffness at a frequency corresponding to an order of a higher-order component to be predicted when said tire rolls at a low speed, and a high-speed dynamic stiffness at a frequency corresponding to said order when said tire rolls at a high speed;

measuring, for each of the tires within the lot of tires, a variation component of load when the tire rolls at a low speed, and a rolling radius variation; and for each of said tires, predicting, as said higher-order component, a variation component of load during rolling at high, on the basis of said low-speed dynamic stiffness, said high-speed dynamic stiffness, said variation component of load, and said rolling radius variation.

2. A method for predicting a higher-order component of high speed uniformity of a tire according to claim 1, wherein said low-speed dynamic stiffness and said high-speed dynamic stiffness are each measured based on a transfer characteristic of a vertical axial force of said one of tires within the lot of tires.

3. A method for predicting a higher-order component of high speed uniformity of a tire according to claim 1, wherein said variation components of load at the time of low speed rolling and said rolling radius variations are measured by a low speed uniformity machine.

4. A method for predicting a higher-order component of high speed uniformity of a tire according to claim 1, wherein measurement of said rolling radius variation is performed by measuring a variation component of longitudinal force at a low speed based on a linear regression equation of said rolling radius variation at a low speed and the variation component of longitudinal force at a low speed.

5. An apparatus for predicting a higher-order component of high speed uniformity of a tire, comprising:

first measuring means for measuring, for one of tires within one lot of tires, a low-speed dynamic stiffness at a frequency corresponding to an order of a higher-order component to be predicted when said tire rolls at a low speed, and a high-speed dynamic stiffness at a frequency corresponding to said order when said tire rolls at a high speed;

second measuring means for measuring, for each of the tires within the lot of tires, a variation component of load when the tire rolls at a low speed, and a rolling radius variation; and predicting means for predicting, for each of said tires, as said higher-order component, a variation component of load during rolling at high speed, on the basis of said low-speed dynamic stiffness, said high-speed dynamic stiffness, said variation component of load, and said rolling radius variation.

6. An apparatus for predicting a higher-order component of high speed uniformity of a tire according to claim 5, wherein said first measuring means is based on a transfer characteristic of a vertical axial force of said tire.

7. An apparatus for predicting a higher-order component of high speed uniformity of a tire according to claim 5, wherein said second measuring means is a low speed uniformity machine.

8. An apparatus for predicting a higher-order component of high speed uniformity of a tire according to claim 5, wherein in said second measuring means measures said rolling radius variation by using a linear regression equation of said rolling radius variation at a low speed and the variation component of longitudinal force at a low speed.

9. An apparatus for predicting a higher-order component of high speed uniformity of a tire according to claim 8, wherein said apparatus for predicting further comprises a computer, and measured results of said low speed dynamic stiffness and said high speed dynamic stiffness, and said linear regression equation are stored in a RAM of said computer.

10. A method for predicting a higher-order component of high speed uniformity of a tire, comprising the steps of:

measuring, for one of tires within one lot of tires, a low-speed dynamic stiffness at a frequency corresponding to an order of a higher-order component to be predicted when said tire rolls at a low speed, and a high-speed dynamic stiffness at a frequency corresponding to said order when said tire rolls at a high speed;

measuring, for each of the tires within the lot of tires, a variation component of longitudinal force when the tire rolls at a low speed, and a rolling radius variation; and for each of said tires, predicting, as said higher-order component, a variation component of longitudinal force during rolling at high, on the basis of said low-speed dynamic stiffness, said high-speed dynamic stiffness, said variation component of longitudinal force, and said rolling radius variation.

11. A method for predicting a higher-order component of high speed uniformity of a tire according to claim 10, wherein said low-speed dynamic stiffness and said high-speed dynamic stiffness are each measured based on a transfer characteristic of longitudinal axial force of said one of tires within the lot of tires.

12. A method for predicting a higher-order component of high speed uniformity of a tire according to claim 10, wherein said variation components of longitudinal force at the time of low speed rolling and said rolling radius variations are measured by a low speed uniformity machine.

13. A method for predicting a higher-order component of high speed uniformity of a tire according to claim 10, wherein measurement of said rolling radius variation is performed by measuring a variation component of longitudinal force at a low speed based on a linear regression equation of said rolling radius variation at a low speed and the variation component of longitudinal force at a low speed.

14. An apparatus for predicting a higher-order component of high speed uniformity of a tire, comprising:

first measuring means for measuring, for one of tires within one lot of tires, a low-speed dynamic stiffness at a frequency corresponding to an order of a higher-order component to be predicted when said tire rolls at a low speed, and a high-speed dynamic stiffness at a frequency corresponding to said order when said tire rolls at a high speed;

second measuring means for measuring, for each of the tires within the lot of tires, a variation component of longitudinal force when the tire rolls at a low speed, and a rolling radius variation; and predicting means for predicting, for each of said tires, as said higher-order component, a variation component of longitudinal force during rolling at high speed, on the basis of said low-speed dynamic stiffness, said high-speed dynamic stiffness, said variation component of longitudinal force, and said rolling radius variation.

15. An apparatus for predicting a higher-order component of high speed uniformity of a tire according to claim 14, wherein said first measuring means is based on a transfer characteristic of longitudinal axial force of said tire.

16. An apparatus for predicting a higher-order component of high speed uniformity of a tire according to claim 14, wherein said second measuring means is a low speed uniformity machine.

17. An apparatus for predicting a higher-order component of high speed uniformity of a tire according to claim 5, wherein in said second measuring means measures said rolling radius variation by using a linear regression equation of said rolling radius variation at a low speed and the variation component of longitudinal force at a low speed.

18. An apparatus for predicting a higher-order component of high speed uniformity of a tire according to claim 17, wherein said apparatus for predicting further comprises a computer, and measured results of said low speed dynamic stiffness and said high speed dynamic stiffness, and said linear regression equation are stored in a RAM of said computer.

19. A method of manufacturing tires, comprising the step of selecting tires by using variation components of load when tires roll at a high speed, the variation components being predicted by the method for predicting a higher-order component of high speed uniformity of a tire according to claim 1.

20. A method of manufacturing tires, comprising the step of selecting tires by using a variation components of longitudinal force when tires roll at a high speed, the variation components being predicted by the method for predicting a higher-order component of high speed uniformity of a tire according to claim 10.

* * * * *